(12) United States Patent
Wilson et al.

(10) Patent No.: US 7,797,475 B2
(45) Date of Patent: Sep. 14, 2010

(54) FLEXIBLY CONFIGURABLE MULTI CENTRAL PROCESSING UNIT (CPU) SUPPORTED HYPERTRANSPORT SWITCHING

(75) Inventors: Lee H. Wilson, Austin, TX (US); Kirby L. Watson, Austin, TX (US); Vinh B. Lu, Austin, TX (US); Mark W. Mueller, Austin, TX (US); Daniel E. Hurlimann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 11/627,514

(22) Filed: Jan. 26, 2007

(65) Prior Publication Data

US 2008/0184021 A1    Jul. 31, 2008

(51) Int. Cl.
*G06F 13/36* (2006.01)
(52) U.S. Cl. .................. 710/311; 710/104; 710/312; 710/306; 710/316; 710/305
(58) Field of Classification Search .................. 710/301, 710/302, 306, 311, 104, 309, 312, 316, 317, 710/305; 370/463, 465
See application file for complete search history.

(56) References Cited

U.S. PATENT DOCUMENTS

| | | | | |
|---|---|---|---|---|
| 5,535,341 | A * | 7/1996 | Shah et al. | 710/310 |
| 5,689,722 | A * | 11/1997 | Swarztrauber | 712/12 |
| 6,167,492 | A * | 12/2000 | Keller et al. | 711/154 |
| 6,438,622 | B1 * | 8/2002 | Haghighi et al. | 710/1 |
| 6,452,601 | B1 * | 9/2002 | Marino et al. | 345/538 |
| 6,463,510 | B1 * | 10/2002 | Jones et al. | 711/138 |
| 6,618,783 | B1 * | 9/2003 | Hammersley | 710/305 |
| 6,836,813 | B1 | 12/2004 | Gulick | |
| 7,024,510 | B2 * | 4/2006 | Olarig | 710/311 |
| 7,106,600 | B2 * | 9/2006 | Kupla et al. | 361/783 |
| 7,171,499 | B2 * | 1/2007 | Kelley et al. | 710/104 |
| 7,412,554 | B2 * | 8/2008 | Danilak | 710/306 |
| 2003/0012187 | A1 | 1/2003 | Avery | |
| 2004/0122973 | A1 | 6/2004 | Keck et al. | |
| 2006/0080484 | A1 * | 4/2006 | Lefebvre et al. | 710/104 |
| 2007/0143520 | A1 * | 6/2007 | Yang et al. | 710/306 |

OTHER PUBLICATIONS

Intel Corporation. MultiProcessor Specification. Version 1.4. May 1997.*

(Continued)

*Primary Examiner*—Mark Rinehart
*Assistant Examiner*—Matthew D Spittle
(74) *Attorney, Agent, or Firm*—Cynthia G. Seal, Esq.; Steven M. Greenberg, Esq.; Carey, Rodriguez, Greenberg & Paul, LLP

(57) ABSTRACT

Embodiments of the invention address deficiencies of the art in respect to hypertransport-based switching for multi-CPU systems and provide a method, system and computer program product for flexibly configurable multi-CPU supported hypertransport switching. In one embodiment of the invention, a hypertransport switching data processing system can be provided. The system can include a CPU and at least two I/O bridges. Each I/O bridge can provide a communications path for data driven to a corresponding peripheral device from the CPU. Notably, the system can include a flexibly configurable hypertransport switch. The switch can include a first configuration adapting the CPU to both of the I/O bridges, and a second configuration adapting the CPU to a first one of the I/O bridges and a second CPU to a second one of the I/O bridges.

6 Claims, 2 Drawing Sheets

OTHER PUBLICATIONS

Advanced Micro Devices, Inc. HyperTransport Technology I/O Link. White Paper. Jul. 20, 2001.*

HyperTransport Technology Consortium. HyperTransport I/O Technology Overview. White Paper. Rev. 001. Jun. 2004.*

* cited by examiner

FLEXIBLY CONFIGURABLE MULTI CENTRAL PROCESSING UNIT (CPU) SUPPORTED HYPERTRANSPORT SWITCHING

BACKGROUND OF THE INVENTION

1. Field of the Invention

The present invention relates to the field of hypertransport-based switching and more particularly to hypertransport switching multiple central processing units (CPU) in a computing architecture.

2. Description of the Related Art

While CPU performance continues to increase rapidly, the performance of the input/output (I/O) bus architecture has lagged significantly. High-resolution, 3D graphics and streaming video are increasing bandwidth demand between micro CPUs and graphics CPUs. A number of new technologies are responsible for the increasing demand for additional bandwidth. The Scalable Link Interface (SLI) is a method developed for linking two or more graphics cards together via parallel processing in order to increase the processing power available for graphics. In SLI graphics schemes, two identical graphics cards are used to control the screen. Typically, each graphics card controls half the screen. With SLI graphics technology, it is possible to roughly double the amount of graphics complexity that can be handled by a computer system with the addition of the second graphics card.

A common requirement to implement SLI graphics schemes is that data processing systems have more than one CPU for optimal performance. Two separate CPUs typically will generate two separate data streams to the two identical graphics cards and transmit to two separate I/O bridges that are directly connected to each CPU generating its half of the graphics traffic. Unfortunately, when a system has a single CPU, SLI support cannot live up to its full potential. Supporting the minimal single CPU system requires a significant sacrifice in SLI graphics performance since all of the I/O would have to be connected to one single CPU in the absence of a second CPU.

Traditionally, to support a multi-CPU SLI scheme, firmware and supporting architecture must be provided specific to the multi-CPU scheme. Newer versions of processors using hypertransport may need two hypertransports between processors in dual processor socket systems to provide adequate memory performance.

By comparison, different firmware and supporting architecture must be provided to support single-CPU scheme, because the infrastructure of the multi-CPU scheme differs from that of the single CPU scheme. Thus, the presence or absence of a multi-CPU scheme must be known a priori at the time of manufacture in order to provide the proper firmware and supporting architecure. Yet, many end-users prefer to purchase a minimal configuration with an option to upgrade from a single-CPU system to a multi-CPU system on one platform. So much, however, is not possible given the disparate firmware and architecture required to support the multi-CPU scenario.

BRIEF SUMMARY OF THE INVENTION

Embodiments of the invention address deficiencies of the art in respect to hypertransport-based switching for multi-CPU systems and provide a novel and non-obvious method, system and apparatus for flexibly configurable multi-CPU supported hypertransport switching. In one embodiment of the invention, a hypertransport switching data processing system can be provided. The system can include a CPU and at least two I/O bridges. Each I/O bridge can provide a communications path for data driven to a corresponding peripheral device from the CPU. Notably, the system can include a flexibly configurable hypertransport switch. The switch can include a first configuration adapting the CPU to both of the I/O bridges, and a second configuration adapting the CPU to a first one of the I/O bridges and a second CPU to a second one of the I/O bridges. Finally, the system can include hypertransport balancing logic. The logic can include program code enabled to detecting either a single central processing unit (CPU) configuration or a multi-CPU configuration upon bootstrap. The hypertransport balancing logic can typically be done in firmware but it also can be implemented automatically in hardware.

In one embodiment of the invention, a basic I/O system (BIOS) comprising firmware can be included. The firmware can include program code enabled to set the flexibly configurable hypertransport switch to one of the first configuration and the second configuration. Moreover, the program code can be enabled to set the flexibly configurable hypertransport switch to one of the first configuration and the second configuration based upon detecting either a single CPU coupled to the BIOS or multiple CPUs coupled to the BIOS.

The first configuration can include a switched coupling of the CPU to the second one of the I/O bridges through the hypertransport switch. The second configuration comprises a switched coupling of the second CPU to the second one of the I/O bridges through the hypertransport switch. Alternatively, the second configuration can include a switched coupling of the first CPU to the second CPU through the flexibly configurable hypertransport switch.

There can be any number of additional bridges and CPUs in this scheme. The hypertransport switch described can support a minimal configuration adapting a single CPU to both IO bridges or a larger configuration where one or more additional processors can be added with each of the IO bridges are assigned to separate CPUs. In yet another embodiment of the invention, the peripheral devices can include different graphics cards. Alternatively, the peripheral devices can include different graphics cards of identical type in a scalable link interface (SLI) scheme.

In another embodiment of the invention, a hypertransport switching method can be provided and can include detecting either a single central processing unit (CPU) configuration or a multi-CPU configuration upon bootstrap and responsive to detecting the single CPU configuration, adapting a hypertransport switch for coupling a single CPU to dual input/output (I/O) bridges, each providing a communications path for data driven to a corresponding peripheral device, and otherwise adapting the hypertransport switch for coupling each CPU in the multi-CPU configuration to a corresponding one of the dual I/O bridges.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide a method, system and computer program product for flexibly configurable multi-CPU supported hypertransport switching. In accordance with an embodiment of the present invention, a flexibly configurable hypertransport switch can be disposed in a computing architecture. The flexibly configurable hypertransport switch can be configured for adapting a single-CPU to multiple different I/O bridges in a single CPU configuration. Alternatively, the flexibly configurable hypertransport switch can be configured for adapting multiple different CPUs to the multiple different I/O bridges in a multi-CPU configuration.

In this regard, during system boot time, the flexibly configurable hypertransport switch can be reconfigured via BIOS to accommodate either the single CPU configuration or the multi-CPU configuration depending upon the presence of one or more CPUs. In response to detecting a single CPU configuration, hypertransport links can be established between the CPU and multiple I/O bridges. By comparison, in response to detecting a multi-CPU configuration, hypertransport links can be enabled between each CPU in the multi-CPU configuration and multiple I/O bridges for optimizing overall system performance.

Figure 1A:
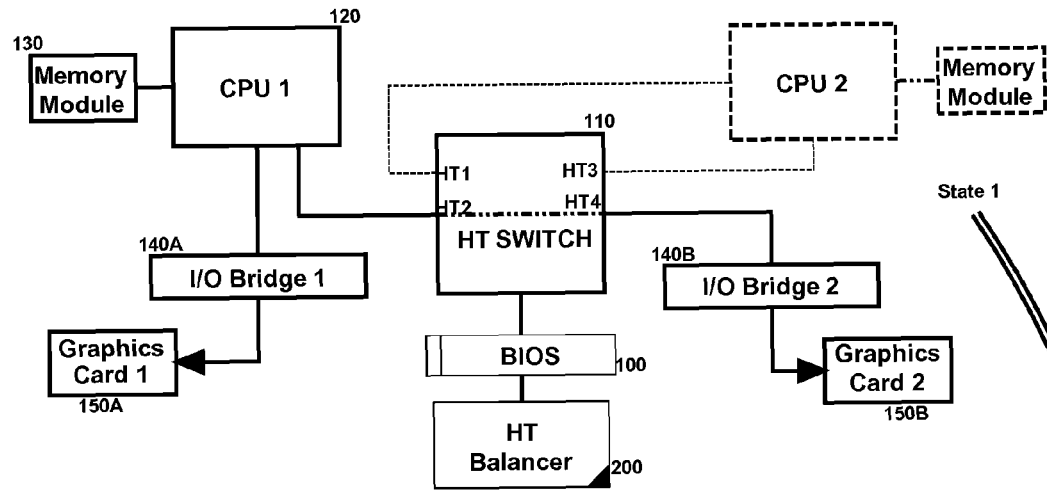
FIG. 1A is a schematic illustration of a computer architecture configured for flexibly configurable multi-CPU supported hypertransport switching.

In further illustration, FIG. 1A is a schematic illustration of a flexibly configurable hypertransport switching data processing system. As shown in FIG. 1A, the system can include a single CPU 120 coupled to memory module 130. The CPU 120 further can be coupled to a first I/O bridge 140A providing a communications path for data driven to peripheral device 150A, for example a graphics card. The CPU 120 further can be coupled to a second I/O bridge 140B through hypertransport (HT) switch 110. As in the case of the first I/O bridge 140A, the second I/O bridge 140B can provide a communications path for data driven to peripheral device 150B, for example another graphics card in order to support an SLI graphics scheme. The flexibly configured hypertransport switch 110 can be reconfigured via BIOS 100 which is already enabled for setting up additional HT links (HT1, HT3) in the case of an upgrade to a multi-CPU system. The BIOS 100 can implement the HT Balancer 300 to reconfigure the system depending on how many CPUs are present in the current system. The HT balancer 300 can be either system firmware or hardware on the system motherboard.

Figure 1B:
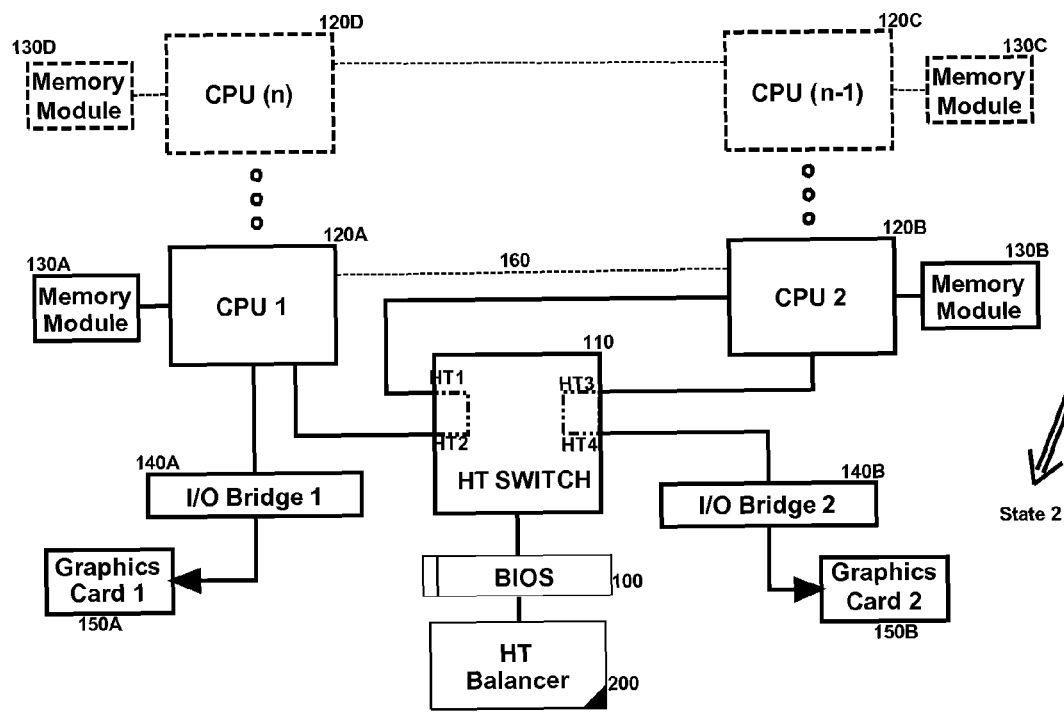
FIG. 1B is a schematic illustration of a computer architecture configured for flexibly configurable multi-CPU supported hypertransport switching; and, FIG. 2 is a flow chart illustrating a process for flexibly configuring a hypertransport switch for multi-CPU support.

FIG. 1B is a schematic illustration of a flexibly configurable multi-CPU supported hypertransport switching system. As shown in FIG. 1B, the system can include multiple CPUs, 120A, B, C, D coupled to multiple memory modules 130A, B, C, D. The multiple CPUs 120A, B, C, D can further be coupled to a first I/O bridge 140A providing a communications path for data driven to peripheral device 150A, for example a graphics card. The multiple CPUs 120A, B, C, D can further be coupled to a second I/O bridge 140B through hypertransport (HT) switch 110. As in the case of the first I/O bridge 140A, the second I/O bridge 140B can provide a communications path for data driven to peripheral device 150B, for example another graphics card in order to support an SLI graphics scheme. The flexibly configured hypertransport switch 110 can be reconfigured via BIOS 100 to enable additional HT links (HT1, HT3) for the multi-CPU computer architecture. Thus, BIOS 100 can implement HT Balancer logic 200 to adapt the system to a multi-CPU configuration during boot time.

Figure 2:
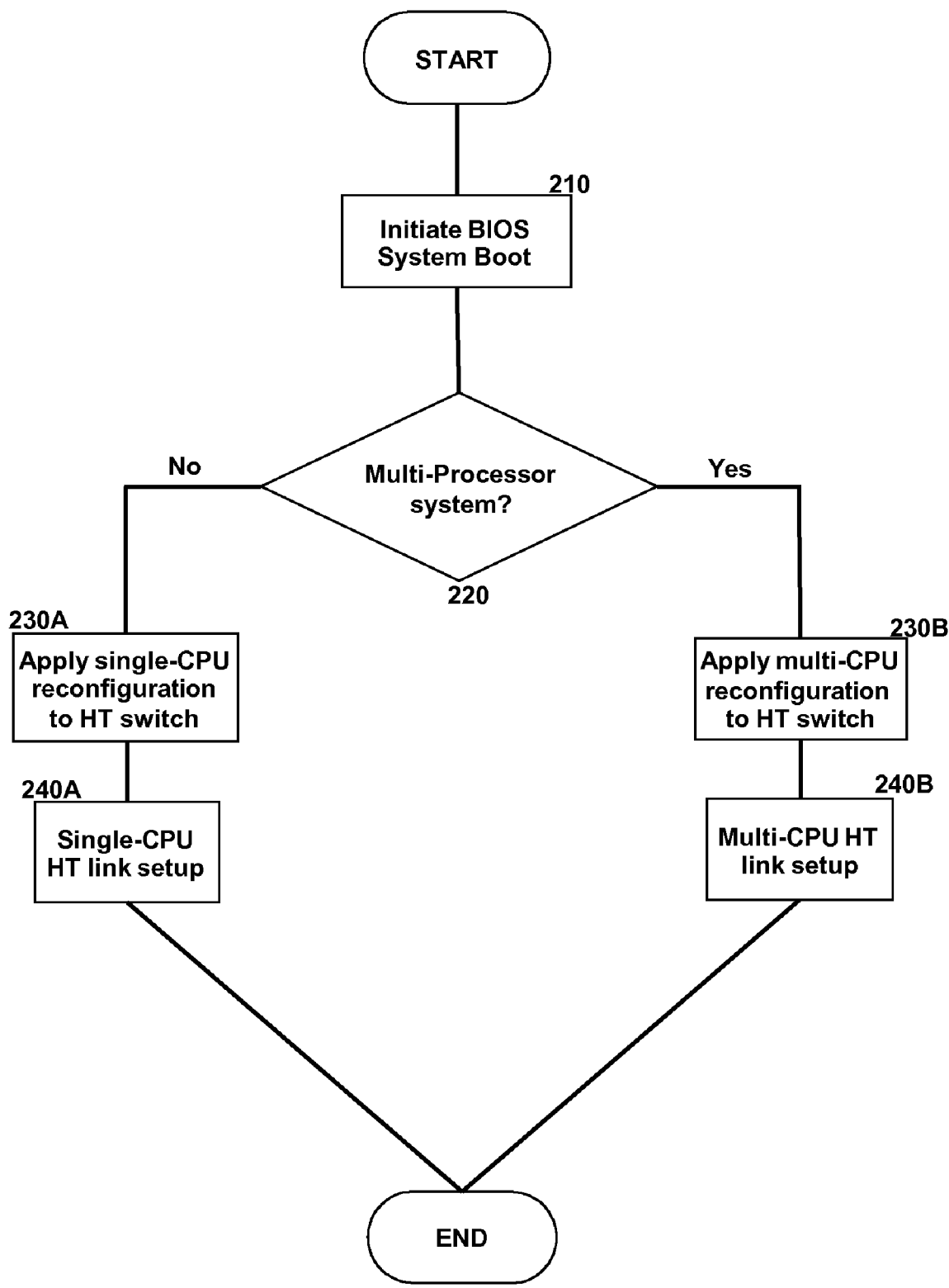

FIG. 2 is a flow chart illustrating a process for flexibly configurable multi-CPU support hypertransport switching. Beginning in block 210, BIOS can be initiated at system boot time to accommodate either a single CPU configuration or a multi-CPU configuration. In block 220, it can be determined whether or not a multi-processor system is detected. If only one CPU is detected, then block 230A can be implemented to reconfigure the HT switch. Next in block 240A, a single CPU HT link setup can be established by setting up HT links to optimize connections with the I/O Bridges and CPU. If a multi-CPU system is detected, block 230B can be implemented to reconfigure the HT switch to enable new HT connections. Next in block 240B, a multi-CPU HT link setup can be established by setting up new HT links to optimize I/O traffic and CPU interconnections due to a doubling of the memory bandwidth between CPUs. Adding a second HT link between CPUs can lead to improved performance gains in multi-processor configurations.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A switching data processing system comprising:
    a first socket configured to receive a first central processing unit;
    a second socket configured to receive a second central processing unit;
    a first input/output (I/O) bridge;
    a second I/O bridge, each of the first and second I/O bridges providing respective communications paths to a corresponding peripheral device;
    a flexibly configurable switch comprising
        a first configuration connecting the first socket to the second I/O bridge, and
        a second configuration connecting the second socket to the second I/O bridge; and
    a basic I/O system (BIOS) configured to set the switch to one of the first configuration and the second configuration based upon detecting either a single CPU coupled to the BIOS or multiple CPUs coupled to the BIOS.

2. The system of claim 1, wherein
the first configuration comprises a switched coupling of the first socket to the second I/O bridge through the switch.

3. The system of claim 1, wherein
the second configuration comprises a switched coupling of the second socket to the second I/O bridge through the switch.

4. The system of claim 3, wherein
the second configuration further comprises a switched coupling of the first socket to the second socket through the switch.

5. The system of claim 1, wherein
the peripheral devices comprise different graphics cards.

6. The system of claim 5, wherein
the peripheral devices comprises different graphics cards of identical type in a scalable link interface (SLI) scheme.

* * * * *